Sept. 23, 1930. F. A. TRUESDELL 1,776,302
DRIVING MECHANISM
Filed Dec. 23, 1927 2 Sheets-Sheet 1
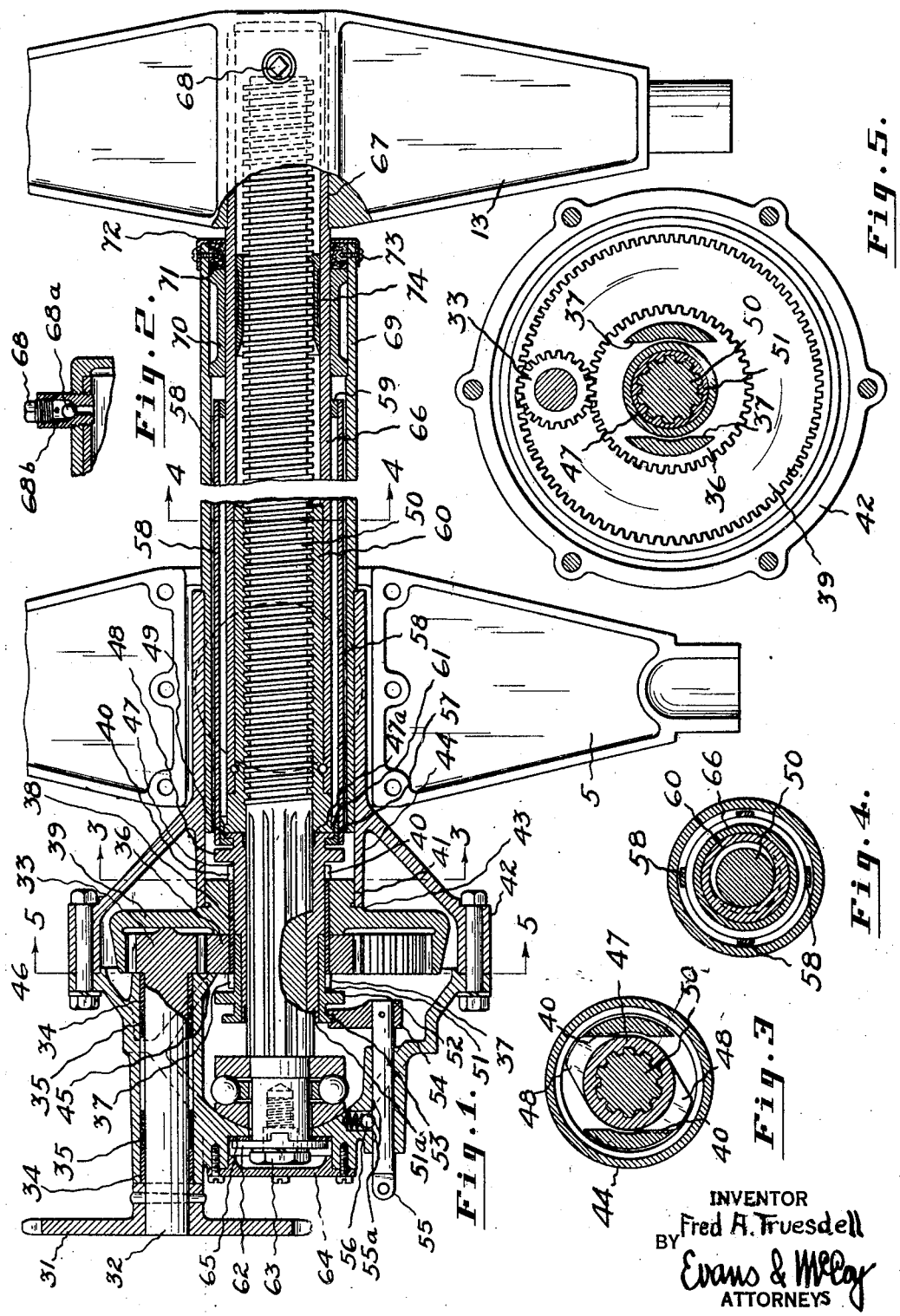
INVENTOR
Fred A. Truesdell
BY Evans & McCoy
ATTORNEYS Sept. 23, 1930.  F. A. TRUESDELL  1,776,302
DRIVING MECHANISM
Filed Dec. 23, 1927  2 Sheets-Sheet 2

INVENTOR
Fred A. Truesdell
BY
Evans & McCoy
ATTORNEYS

Patented Sept. 23, 1930

1,776,302

UNITED STATES PATENT OFFICE

FRED A. TRUESDELL, OF CLEVELAND, OHIO

DRIVING MECHANISM

Application filed December 23, 1927. Serial No. 242,136.

This invention relates to improvements in driving mechanisms, and particularly to driving mechanisms for hoists of the type in which the movable actuating member of the hoist is operated by a shaft which may be driven in either direction and in which means is provided for automatically disconnecting the shaft from its driving means at opposite limits of movement of the actuating member.

One object of the present invention is to provide a reversing or change-speed gear drive of compact form which may be housed in a relatively small casing in which a minimum number of gears and shafts are employed and in which the clutch sleeve is mounted directly on the driven shaft.

Another object of the invention is to provide an automatic kickout for the clutches which includes no levers or other operating members liable to be broken or otherwise rendered inoperative in service.

A further object of the invention is to provide automatic clutch releasing means in which the clutch sleeve is actuated by a nut which travels on the driven shaft.

While various forms of gears may be employed in the drive without departing from the invention, the reversing gears are preferably a spur gear and an internal gear both meshing with a driving pinion which drives them in opposite directions, the gears being both mounted on the driven shaft and adapted to be selectively clutched to the same by means of a clutch sleeve slidably keyed to the driven shaft and interposed between the shaft and gears.

A further object of the invention is to provide a manual control for the clutch sleeve which does not interfere with the automatic shifting thereof by the nut, which, at the limits of movement of the nut, is not operable to move the sleeve in a direction to re-engage the clutch previously disengaged automatically by the nut and which is operable in either direction while the nut is in intermediate positions so that the operation of the hoist in intermediate positions thereof is entirely under the control of the operator.

A further object of the invention is to provide a reversing mechanism for hoist drives in which a plurality of driving gears are mounted on an underrunning clutch sleeve slidably splined to the driven shaft and in which the gears are rotatably mounted one upon another so that the sleeve has frictional engagement only with the gear through which the load is lifted so that there can be no frictional tug on the driven shaft tending to drive the same in a direction to lower the load.

With the objects above set forth in view and with other objects which will appear as the description proceeds, the invention may be said to comprise the screw hoist as illustrated in the accompanying drawings hereinafter described and particularly set forth in the appended claims together with such variations and modifications thereof as will be apparent to one skilled in the art to which the invention appertains.

Reference should be had to the accompanying drawings forming a part of the specification in which:

Figure 1 is a longitudinal section through a hoist in which the driving mechanism is employed.

Figs. 2, 3, 4 and 5 are transverse sections taken on the lines indicated at 2—2, 3—3, 4—4 and 5—5, respectively, in Fig. 1.

Figure 6:
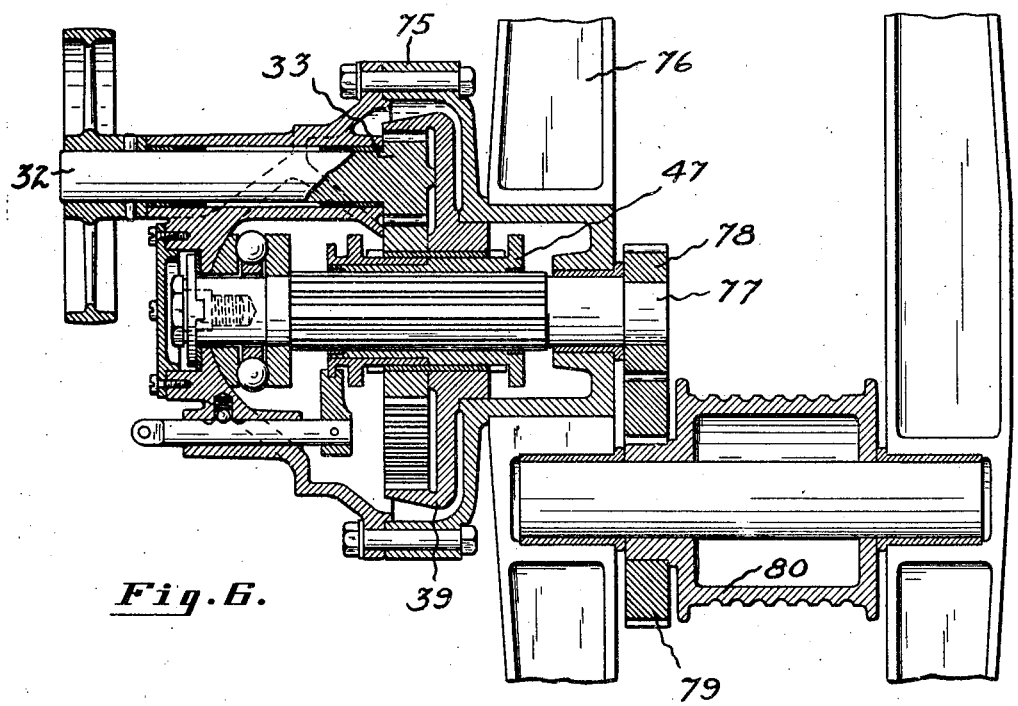
Fig. 6 is a sectional view showing a modified form of the invention.

While the present invention is of quite general application, the particular form herein shown in Figs. 1 to 5 of the drawing is designed for operating a dump truck body lifting mechanism such as shown in my copending application, Serial No. 240,993, filed Dec. 19, 1927, the hoist mechanism being supported upon a cross member 5 extending between the side members of a truck frame and a crosshead 13 which is mounted for movement longitudinally between the side members of the truck frame.

The hoist mechanism receives power from any suitable source such as the engine of the truck, through a sprocket 31, which is fixed to the forward end of a drive shaft 32 to the rear end of which is fixed a pinion 33, the shaft being mounted in bearings 34 provided with oil retaining felt rings 35. Pinion 33 meshes with a spur gear 36 which has its hub recessed to provide clutch faces 37. The gear 36 is rotatably mounted upon a bushing 38 which is fixed to an internal gear 39, which is coaxial with the gear 36 and meshes with the pinion 33. The internal gear 39 has its hub recessed to provide clutch faces 40 for engagement with a clutch element which will be later described. The internal gear 39 has a pilot bearing 41 in a gear case 42 which encloses the gearing and is provided with shoulders 43 which engage with shoulders 44 of the casing to prevent the gear from floating out of registration with the pinion 33. The shoulders 44 engage the rear face of the internal gear and shoulders 45 carried by the gear case cover 46 engage with the forward face of the gear 36 so that the gears 36 and 39 are positively held against movement along their axis within the casing. The bushing 38 carried by the gear 39 and supporting the gear 36 is rotatably mounted upon a sleeve 47, which is mounted for longitudinal movement within the bushing and is provided at its rear end with a pair of diametrically opposite clutch lugs 48 and with a circular flange 49 spaced from the lugs 48. The sleeve 47 is slidably splined to a screw 50 and at its forward end there is fastened a sleeve 51 which has integral laterally projecting clutch lugs 52 corresponding to the lugs 48 at the rear end of the sleeve 47 and a circular flange 53 corresponding to the circular flange 49 at the rear end of the sleeve 47.

To provide a sliding bearing for the sleeves 47 and 51 on the screw 50, a hardened bushing 47ª is secured in the sleeve 47 at its rear end and a hardened bushing 51ª is secured in the sleeve 51 at its forward end, these bushings which have a sliding fit on the splined portion of the screw 50 hold the sleeves 47 and 51 centered and in true alinement with respect to the screw 50 and prevent rocking of the gears 36 and 39 riding thereon. The recesses in the hubs of the gears 36 and 39 extend diametrically across the hubs and are of a width to receive the lugs 48 and 52. The lugs 48 and 52 taper toward their outer ends and have flat tangential laterally inclined faces which engage with the laterally inclined clutch faces on the hubs of the gears, this construction providing a liberal amount of angular play between the engaging lugs of the clutch elements to facilitate the engagement thereof and providing also a very substantial construction in which ample strength is provided in the driving elements of the clutches. The tangential engagement between the clutch faces is highly advantageous in that it serves to cushion the impact as the clutch faces come into engagement and lessen the strain on the clutches and driving elements. The sleeves 47 and 51 which are fastened together, move as a unit to alternately clutch the gear 36 and the gear 39 to the screw 50 and for shifting the clutch sleeve, a shifter fork 54 straddles the flange 53 and is moved longitudinally of the screw by means of a shifter rod 55 slidably mounted in the cover 46 to the casing. In order to hold the clutch sleeve in clutching engagement with either the gear 36 or the gear 39 or in intermediate neutral position, the rod 55 is provided with three notches 55ª which are engaged by a spring pressed ball detent 56 mounted in the casing cover, the three recesses of the shifter rod being so positioned as to hold the sleeve in each of its two clutching positions or in the intermediate neutral position and the ball detent permitting movement of the clutch sleeve by automatic shifting means which will be hereinafter described. The clutch shifter above described may be operated by any suitable manually operable connection so that the hoist mechanism is at all times under the control of the operator.

It is desirable in a mechanism of this character that means be provided for automatically disconnecting the screw from the driving mechanism at the upward limit of movement of the load and also at the lower limit of movement thereof. Automatic kickout devices are commonly provided in screw hoists for truck bodies, but such devices usually include a series of reversing levers actuated by trips for actuating the clutches. Such reversing levers and trip devices are apt to get out of order in service, and by their failure to operate properly serious damage may be done to the hoist mechanism.

I have provided a very simple and reliable non-reversing means for automatically disengaging the clutch elements at the limits of movement, which means will now be described.

A split collar 57 fits upon the flange 49 at the rear end of the sleeve 47, and to these collars are fastened longitudinally extending kickout bars 58, which at their rear ends are attached to a collar 59. Mounted on the screw 50, there is an elongated nut 60 which has a shoulder 61 at its rear end which engages with the collar 59 near the rearward limit of movement of the nut to pull the sleeve 47 rearwardly to neutral position and disengage the clutch lugs 48 from the clutch faces 40 on the hub of the internal gear 39 disconnecting the screw from the gear. Adjacent the forward limit of movement of the nut, it engages the rear end of the sleeve 47, forcing the sleeve rearwardly to neutral position and disengaging the clutch lugs 52 from the clutch faces 37 on the hub of the gear 36 to free the screw from the gear. The nut 60 is connected by means which will later be described to the crosshead 13 and shifts the crosshead back and forth on its supporting track, the nut at its limits of travel, by engagement with the collar 39 and sleeve 47, automatically disengaging the splined sleeve 47 from the screw driving gears 36 and 39 so that the screw is automatically disengaged from the driving gears at the upper limit of movement of the load and also when the body has reached its normal position on the return movement.

During the lifting movement, the nut 60 is moved rearwardly by the screw which is rotated in the proper direction by the large internal gear 39 which is driven by the relatively small pinion 33. During the return movement, the screw is driven in the opposite direction through the pinion 33 and gear 36. The gear ratio provided by the pinion 33 and internal gear 39 provides a relatively slow lifting movement and the gear ratio between the pinion 33 and gear 36 provides a relatively rapid rate of rotation for the screw during the return movement. The screw 50 is held against endwise movement during the lifting movement by thrust upon the pilot bearing 41 and an additional thrust bearing may be provided for holding the screw against rearward movement during its rotation in the opposite direction to return the truck body to normal position. Since the thrust on the screw in a rearward direction is relatively light, this thrust may be taken by a lug washer 62 fixed to the rear end of the screw by means of a pilot screw 63, the washer 62 bearing against a thrust washer 65 mounted in a recess in the gear case cover 46, which is closed by a cap 64.

The nut 60 is connected to the crosshead 13 and held against rotation with the screw by means of a sleeve 66 fastened to the nut and projecting rearwardly therefrom past the end of the screw 50 and pressed into a socket 67 formed centrally in the crosshead 13, the nut and sleeve forming a swivel connection permitting the necessary angular movement of the crosshead about the axis of the screw. The sleeve 66 is open at its rear end and the socket 67 and sleeve form a chamber which may be filled with lubricant for the screw and nut, the crosshead 13 being provided with a suitable opening provided with a closure plug 68 by means of which lubricant may be introduced into this chamber. Mounted in the opening, there is a ball check valve 68ª which may be forced outwardly to permit escape of air upon forward movement of the crosshead and which is drawn against its seat upon rearward movement of the crosshead, air forced past the check valve 68ª escaping through a vent 68ᵇ in the plug 68. The valve also serves to seal the chamber against entry of air during rearward movement of the crosshead so that the reduced pressure within the sleeve 66 tends to suck lubricant from the rear case into the threads of the screw and nut. The sleeve 66 and kickout bars 58 are enclosed within the housing sleeve 69 which is pressed into the gear case 42 at its forward end and which is provided at rear end with a bushing 70 and a felt wiper ring 71, the bushing forming a bearing in which the longitudinally movable sleeve 66 slides during the operation of the screw. The felt wiper ring 71 is held in place by a pressed steel cap 72 secured to the housing sleeve 69 by means of screws 73. Mounted within the sleeve 66 there is a screw rest and guide 74 which serves to maintain the alinement of the screw and to provide a rest for the same while the screw is not in operation and is being jostled about.

When it is desired to operate the hoist, the operator shifts the rod 55 forwardly to move the underrunning clutch sleeve 47 to a position in which the lugs 48 of the sleeve engage the clutch faces 40 of the internal gear 39 whereupon the screw 50 is rotated at the relatively slow rate of speed provided by the drive through the large internal gear 39 and the nut 60 is moved rearwardly along the screw, shifting the crosshead 13. This movement continues until the shoulder 61 of the nut 60 engages the collar 59, whereupon the screw is automatically disengaged from the gear 39 and the load is held in elevated position until the operator actuates the shifter rod 55 to engage the clutch lugs 52 with the clutch faces 37 of the gear 36, whereupon the screw is rotated by the gear 36 which is driven by the gear 33 at a rate considerably faster than during the lifting movement in order to return the nut at a relatively high speed. When the nut is in its forward position, it lies in the path of the underrunning sleeve 47 and will prevent movement of the sleeve in a rearward direction, and when in its rearmost position, the nut 60 is in the path of the collar 59 and prevents movement of the sleeve in a forward direction. The operator, therefore, cannot shift the clutch in the wrong direction and the automatic kickout insures correct operation of the manual control. While the nut 60 is in intermediate position on the screw, the hoist is wholly under the control of the operator who by shifting the clutch sleeve may stop the screw with the nut in any desired position and may then shift the underrunning sleeve in either direction to engage the proper clutches to rotate the screw in a direction to raise or lower the load as desired. The reversing drive for the screw, including three gears only, operating in the same plane, with two of the gears, an internal gear and a spur gear, mounted on the clutch sleeve which is slidably splined to the screw, is an exceedingly compact mechanism which may be housed in a gear case of small diameter at the end of the screw. The provision of a clutch sleeve interposed between the screw shaft and gears and the provision of means for actuating this sleeve directly from a nut on the screw is very advantageous since the kickout thus provided is positive and reliable and not liable to be rendered inoperative in service.

The invention as above described is applied to a screw hoist, but it is to be understood that the invention in its broader aspects is of quite general application.

Fig. 6 of the drawing shows the invention applied to a hoist of the drum and cable type. In this modification the reversing drive mechanism is mounted within a housing 75 secured to a hoist supporting frame 76, the reversing gears, driving gears and clutch sleeve corresponding exactly to the same parts in the modification first described, and being designated by the same reference numerals. The sleeve 47, however, is slidably keyed to a short shaft 77 to which is fixed a spur gear 78 which meshes with a spur gear 79 fixed to the shaft of a hoist drum 80.

Figure 7:
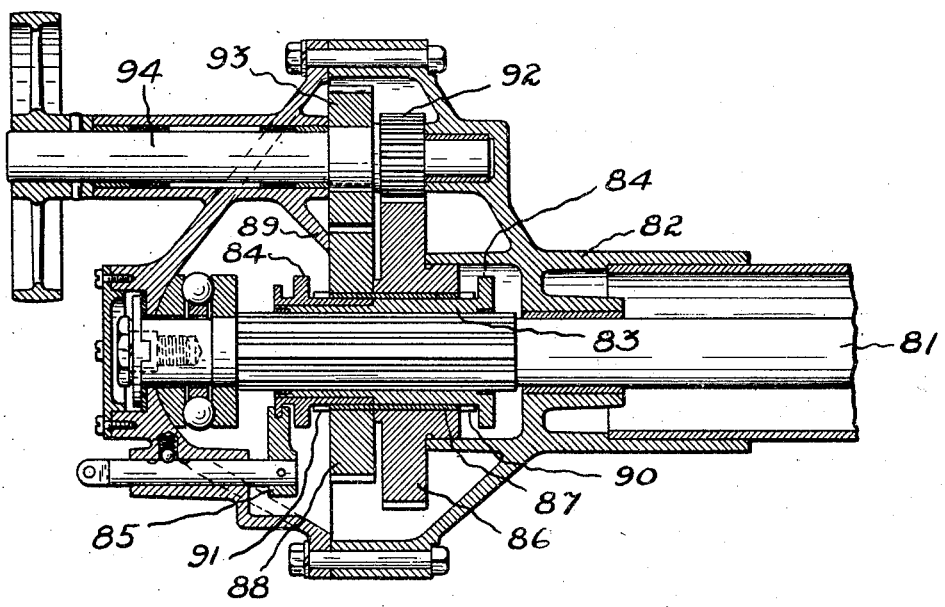
Fig. 7 is a sectional view showing a further modification.

Fig. 7 of the drawing shows a change-speed mechanism embodying the invention. In this modification a driven shaft 81 is journaled in a gear housing 82 and has a sleeve 83 rotatably keyed thereto. The sleeve 83 is provided with clutch elements 84 at the opposite end thereof and has operatively connected thereto a manually operable shifter 85 by means of which the clutch sleeve may be moved longitudinally of the shaft 81. A spur gear 86 is fixedly secured to a bushing 87 which is rotatably mounted upon the clutch sleeve 83 and a spur gear 88 is rotatably mounted upon the bushing 87 alongside the gear 86. The two gears 86 and 88 are held against movement longitudinally of the shaft 81 by means of projections 89 carried by the housing and extending into close proximity to the outer side faces of the gears 86 and 88. The gears 86 and 88 are provided with clutch elements 90 and 91 with which clutch elements 84 of the sleeve 83 are adapted to engage to alternately clutch the gears 86 and 88 to the sleeve. Gears 86 and 88 which are of different pitch diameters, mesh with gears 92 and 93 fixed to a drive shaft 94 which extends into the housing parallel with the driven shaft 81. The two gears 86 and 88 are constantly driven at different speeds by the gears 92 and 93 and by shifting the clutch sleeve 83 either of these gears may be clutched to the sleeve and through the sleeve to the driven shaft 81 so that the shaft 81 may be driven either at the speed of the gear 86 or at the speed of the gear 88.

It will be apparent that the present invention provides a very simple and compact reversing or change speed gearing which is composed of a small number of parts and which occupies but little space.

It will also be apparent that the present invention provides a reversible drive for hoist mechanisms embodying an automatic kickout for stopping the hoist in predetermined positions of the load, that the kickout mechanism includes no reversing levers or other parts likely to be broken or otherwise rendered inoperative in service, and that the reversing mechanism is mounted directly on the driven shaft in such manner that the frictional tug of rotatably mounted parts cannot start the shaft in a direction to lower the load.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. Mechanism of the character described comprising a shaft having a sleeve slidably keyed thereto, an internal gear rotatably mounted on the sleeve, a spur gear within the internal gear and coaxial therewith, a drive shaft having a pinion meshing with both said gears, clutch elements on said gears and sleeve, the clutch elements of the gears being between the clutch elements of the sleeve, and means for shifting said sleeve to clutch either of the gears to said sleeve.

2. Mechanism of the character described comprising a shaft having a splined sleeve slidable thereon, a pair of gears rotatably mounted on the sleeve and positioned one contiguous to the other, means for driving said gears in opposite directions, clutch elements carried by the sleeve, co-operating clutch elements on the gears between the clutch elements of the sleeve, and means for shifting said sleeve axially with respect to said gears to clutch either of said gears to said sleeve.

3. Mechanism of the character described comprising a shaft, means for driving said shaft including a reversing mechanism having a shiftable clutch element, and a nut on the shaft directly engageable with said clutch element for shifting the same.

4. Mechanism of the character described comprising a shaft having a sleeve slidably keyed thereon, a pair of gears rotatable on said sleeve and held against longitudinal movement, means for driving said gears in opposite directions, clutch elements carried by the sleeve and gears, a nut mounted to travel on the shaft, said nut being engageable directly with the sleeve in its travel in one direction, and means in the path of movement of said nut in its travel in the opposite direction for shifting said sleeve in the opposite direction.

5. Mechanism of the character described comprising a shaft having a sleeve slidably keyed thereon, a pair of gears rotatable on said sleeve and held against longitudinal movement, means for driving said gears in opposite directions, clutch elements carried by the sleeve and gears, a nut mounted to travel along the shaft and engageable directly with the sleeve upon movement of the nut in one direction, and a collar attached to the sleeve with which the nut engages when traveling in the opposite direction.

6. Mechanism of the character described comprising a shaft having a sleeve slidably keyed thereon, a pair of gears rotatable on said sleeve and held against longitudinal movement therewith, means for driving said gears in opposite directions, clutch elements carried by the sleeve and gears, said sleeve being movable on the shaft to clutch either of said gears and having an intermediate neutral position in which all clutch elements are disengaged, a manually operable shifter connected to said sleeve and having yielding means for holding the sleeve in either clutching position or in neutral position, and a nut mounted to travel on the shaft when the same is rotated, and engageable with said sleeve to shift the same.

7. Mechanism of the character described comprising a shaft having a sleeve slidably keyed thereon, a pair of gears rotatable on said sleeve and held against longitudinal movement therewith, means for driving said gears in opposite directions, clutch elements carried by the sleeve and gears, said sleeve being movable on the shaft to clutch either of said gears and having an intermediate neutral position in which all clutch elements are disengaged, a manually operable shifter connected to said sleeve and having yielding means for holding the sleeve in either clutching position or in neutral position, and a nut mounted to travel on the shaft when the same is rotated, said nut engaging said sleeve when traveling in one direction, and a member attached to the sleeve to move therewith and lying in the path of said nut when the same is traveling in the opposite direction.

8. Mechanism of the character described comprising a shaft having a sleeve slidably keyed thereto, a collar surrounding the shaft and spaced from the sleeve, said collar being connected to the sleeve for movement therewith along the shaft, a nut mounted to travel on the shaft and interposed between the collar and sleeve, said nut being engageable with the collar or sleeve to shift the sleeve, means for driving the shaft, and clutches carried by said sleeve for controlling said driving means.

9. Mechanism of the character described comprising a shaft having a sleeve slidably keyed thereto, a collar surrounding the shaft and spaced from the sleeve, said collar being connected to the sleeve for movement therewith along the shaft, a nut mounted to travel on the shaft and interposed between the collar and sleeve, said nut being engageable with the collar or sleeve to shift the sleeve, a pair of gears rotatable on said sleeve, means for driving said gears in opposite directions, and clutch elements on said sleeve alternately engageable with said gears.

10. Mechanism of the character described comprising a shaft having a sleeve slidably keyed thereto, a collar surrounding the shaft and spaced from the sleeve, said collar being connected to the sleeve for movement therewith along the shaft, a nut mounted to travel on the shaft and interposed between the collar and sleeve, said nut being engageable with the collar or sleeve to shift the sleeve, a pair of gears rotatable on said sleeve, means for driving said gears in opposite directions, clutch elements on said sleeve alternately engageable with said gears, and manually operable means for shifting said sleeve.

11. Mechanism of the character described comprising a shaft, a sleeve keyed to the shaft, a gear rotatably mounted on the sleeve, a second gear coaxial with the first and rotatably mounted thereon, means for driving said gears, clutch elements on the sleeve, clutch elements on the gears between the clutch elements of the sleeve, means for holding the gears against movement longitudinally of their axis, and means for shifting the sleeve to clutch said gears alternately thereto.

12. Mechanism of the character described comprising a shaft, a sleeve keyed to the shaft, a bushing rotatable on the sleeve, a gear fixed to the bushing, a gear rotatable on said bushing, means for driving said gears, clutch elements on said gears and sleeve, and means for shifting said sleeve to clutch either gear thereto.

13. Mechanism of the character described comprising a shaft, a sleeve keyed to the shaft, a gear rotatably mounted on the sleeve, a second gear coaxial with the first and rotatably mounted thereon, means for driving said gears, clutch elements on the sleeve, clutch elements on the gears between the clutch elements of the sleeve, a gear housing, means carried by the housing for holding said gears against movement longitudinally of their axis, and means for shifting said sleeve to clutch the gears alternately thereto.

14. Mechanism of the character described comprising a shaft, a sleeve keyed to the shaft, a gear rotatably mounted on the sleeve, a second gear coaxial with the first and rotatably mounted thereon, means for driving said gears, clutch elements on the gears and sleeve, a gear housing, means carried by the housing for holding said gears against movement longitudinally of their axis, means for shifting said sleeve to clutch the gears alternately thereto, and means for automatically shifting the sleeve to a neutral position to free the shaft after a predetermined rotation of the shaft.

15. Mechanism of the character described comprising a shaft, a sleeve keyed to the shaft, an internal gear rotatable on said sleeve, a spur gear of smaller diameter than the internal gear coaxial therewith and rotatably mounted thereon, a driving pinion meshing with both gears, clutch elements carried by the sleeve, clutch elements on the gears between the clutch elements on the sleeve and means for shifting the sleeve longitudinally to clutch one or the other of the gears to the sleeve.

16. Mechanism of the character described comprising a shaft, a sleeve keyed to the shaft, an internal gear rotatably mounted on said sleeve, a spur gear of smaller diameter than the internal gear coaxial therewith and rotatably mounted thereon, a driving pinion meshing with both gears, clutch elements carried by the gears and sleeve, a gear housing having members engageable with the outer faces of said gears to hold the same against movement longitudinally of their axis, and means for shifting the sleeve to clutch one or the other of the gears thereto.

17. Mechanism of the character described comprising a shaft, a sleeve keyed to the shaft, an internal gear rotatable on said sleeve, a spur gear of smaller diameter than the internal gear coaxial therewith and rotatably mounted thereon, a driving pinion meshing with both gears, clutch elements carried by the gears and sleeve, a gear housing having members engageable with said gears to hold the same against movement longitudinally of their axis, manual means for shifting the sleeve to clutch one or the other of the gears thereto, and means operated by the shaft for automatically shifting the sleeve to a neutral position.

18. Mechanism of the character described comprising a shaft, a sleeve keyed to the shaft, an internal gear rotatable on said sleeve, a spur gear of smaller diameter than the internal gear coaxial therewith and rotatably mounted thereon, a driving pinion meshing with both gears, clutch elements carried by the gears and sleeve, a gear housing having members engageable with said gears to hold the same against movement longitudinally of their axis, manual means for shifting the sleeve to clutch one or the other of the gears thereto, a nut mounted to travel along said shaft upon rotation of said shaft, said nut being engageable directly with the sleeve upon movement in one direction, and a member fixed to the sleeve with which the nut engages when moved in the opposite direction.

In testimony whereof I affix my signature.

FRED A. TRUESDELL.